United States Patent
Mukerjee

(10) Patent No.: US 8,249,871 B2
(45) Date of Patent: Aug. 21, 2012

(54) WORD CLUSTERING FOR INPUT DATA

(75) Inventor: Kunal Mukerjee, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1069 days.

(21) Appl. No.: 11/283,149

(22) Filed: Nov. 18, 2005

(65) Prior Publication Data

US 2007/0118376 A1    May 24, 2007

(51) Int. Cl.
- G06F 17/28    (2006.01)
- G06F 17/27    (2006.01)
- G06F 17/21    (2006.01)
- G10L 15/00    (2006.01)
- G10L 15/14    (2006.01)
- G10L 15/26    (2006.01)
- G10L 17/00    (2006.01)
- G10L 15/04    (2006.01)

(52) U.S. Cl. .............. 704/245; 704/2; 704/9; 704/4; 704/257; 704/237; 704/235; 704/246; 704/251; 704/10

(58) Field of Classification Search .......... 704/1, 9, 704/10, 251, 257, 250, 270.1, 270, 275, 4, 704/237, 245, 2, 235, 246; 707/102
See application file for complete search history.

(56) References Cited

U.S. PATENT DOCUMENTS

| | | | |
|---|---|---|---|
| 5,200,915 A * | 4/1993 | Hayami et al. ............... | 708/520 |
| 5,500,920 A * | 3/1996 | Kupiec ....................... | 704/270.1 |
| 5,675,819 A * | 10/1997 | Schuetze ..................... | 704/10 |
| 5,828,999 A * | 10/1998 | Bellegarda et al. .......... | 704/240 |
| 5,842,161 A | 11/1998 | Cohrs et al. .................. | 704/251 |
| 5,991,712 A * | 11/1999 | Martin ........................ | 704/9 |
| 6,021,384 A | 2/2000 | Gorin et al. | |
| 6,138,087 A * | 10/2000 | Budzinski ................... | 704/9 |
| 6,173,261 B1 * | 1/2001 | Arai et al. .................... | 704/257 |
| 6,243,680 B1 | 6/2001 | Gupta et al. ................. | 704/260 |
| 6,317,707 B1 * | 11/2001 | Bangalore et al. ............ | 704/9 |
| 6,356,864 B1 * | 3/2002 | Foltz et al. ................... | 704/1 |
| 6,385,579 B1 | 5/2002 | Padmanabhan et al. | |
| 6,411,930 B1 * | 6/2002 | Burges ........................ | 704/240 |
| 6,415,248 B1 * | 7/2002 | Bangalore et al. ............ | 704/1 |
| 6,553,366 B1 * | 4/2003 | Miller et al. ................. | 1/1 |
| 6,578,032 B1 | 6/2003 | Chandrasekar et al. ..... | 707/6 |
| 6,763,331 B2 * | 7/2004 | Wakita et al. ................ | 704/251 |
| 6,856,957 B1 * | 2/2005 | Dumoulin .................... | 704/257 |

(Continued)

FOREIGN PATENT DOCUMENTS

EP    1482415    7/2004

(Continued)

OTHER PUBLICATIONS

Satoshi Kaki, Eiichiro Sumita, and Hitoshi Iida. 1998. A Method for Correcting Speech Recognition Using the Statistical features of Character Co-occurrence. COLING-ACL'98, 653-657.*

(Continued)

*Primary Examiner* — Douglas Godbold
*Assistant Examiner* — Edgar Guerra-Erazo
(74) *Attorney, Agent, or Firm* — Merchant & Gould

(57) ABSTRACT

A clustering tool to generate word clusters. In embodiments described, the clustering tool includes a clustering component that generates word clusters for words or word combinations in input data. In illustrated embodiments, the word clusters are used to modify or update a grammar for a closed vocabulary speech recognition application.

20 Claims, 7 Drawing Sheets

U.S. PATENT DOCUMENTS

| | | | |
|---|---|---|---|
| 6,925,432 B2 * | 8/2005 | Lee et al. | 704/5 |
| 7,124,081 B1 * | 10/2006 | Bellegarda | 704/255 |
| 7,379,870 B1 * | 5/2008 | Belvin et al. | 704/255 |
| 7,392,175 B2 * | 6/2008 | Kawatani | 704/9 |
| 7,590,626 B2 * | 9/2009 | Li et al. | 1/1 |
| 7,620,539 B2 * | 11/2009 | Gaussier et al. | 704/2 |
| 7,672,833 B2 * | 3/2010 | Blume et al. | 704/10 |
| 2002/0016798 A1 * | 2/2002 | Sakai et al. | 707/517 |
| 2002/0143529 A1 | 10/2002 | Schmid et al. | |
| 2004/0193414 A1 * | 9/2004 | Calistri-Yeh et al. | 704/245 |
| 2004/0260533 A1 * | 12/2004 | Wakita et al. | 704/4 |
| 2005/0210383 A1 * | 9/2005 | Cucerzan et al. | 715/533 |
| 2006/0212294 A1 * | 9/2006 | Gorin et al. | 704/245 |
| 2006/0230036 A1 * | 10/2006 | Tateno | 707/5 |
| 2007/0058757 A1 * | 3/2007 | Kusume | 375/340 |

FOREIGN PATENT DOCUMENTS

| | | |
|---|---|---|
| JP | 08-263510 | 10/1996 |
| JP | 2001-101194 | 4/2001 |
| JP | 2001-243223 | 9/2001 |
| JP | 2003-288362 | 10/2003 |
| JP | 2004-252775 | 9/2004 |
| WO | WO 01/84357 | 3/2001 |

OTHER PUBLICATIONS

Ute Essen and Volker Steinbiss, 1992, "Co-Occurrence Smoothing for Stochastic Language Modeling," Proceedings of ICASSP, vol. I, pp. 161-164.*

Lawrence Philips, 1990, "Hanging on the Metaphone," Computer Language Magazine, 7(12) : 39.*

Jiang, F. and Littman, M. L. 2000. Approximate Dimension Equalization in Vector-based Information Retrieval. In Proceedings of the Seventeenth international Conference on Machine Learning (Jun. 29-Jul. 2, 2000). P. Langley, Ed. Morgan Kaufmann Publishers, San Francisco, CA, 423-430.*

"Notification of Transmittal of the Internaional Search Report and the Written Opinion of the International Searching Authority, or the Declaration" for PCT/2006/044080; filed Nov. 14, 2006; 9 pages.

First Office Action from related Chinese application No. 200680042792.2 date of dispatch Dec. 25, 2009; 12 pages.

First Office Action from related Chinese application No. 200680042792.2 dated prior to Jan. 23, 2010; 7 pages.

Supplementary European Search Report mailed Aug. 25, 2011 in Application No. 0 683 7492, 7 pages.

Japanese Notice of Rejection mailed Nov. 29, 2011 in Application No. 2008-541262, 10 pages.

Hiroaki Nanjo, et al., "Language Model and Speaking Rate Adaptation for Spontaneous Presentation Speech Recognition," The IEICE Transactions, vol. J87-D-II, No. 8, pp. 1581-1592, Aug. 1, 2004, 14 pages.

Atsushi Sako, et al., "Structuring the Baseball Game Based on Word Cooccurrences after Speech Recognition," The 2005 Spring Meeting of the Acoustical Society of Japan, -I-, pp. 149-150, Mar. 8, 2005, 5 pages.

* cited by examiner

WORD CLUSTERING FOR INPUT DATA

BACKGROUND

Speech recognition applications, such as telephone routing systems, often employ closed grammars or lexicons. For instance, a grammar that is used in a speech recognition application for a company telephone directory system might include a list of proper names of employees of the company. Such a grammar might also include likely responses to prompts or instructions given by the speech recognition application. Therefore, for example, the speech recognition application might ask "Who would you like to speak to?". In response, the user might say "John Doe" at which point the application routes the call to John Doe's extension. However, such systems can have problems if the user's input or response to a prompt is not in the closed grammar, then the application cannot recognize the user's response. For instance, in response to the prompt "Who would you like to speak to?", the user might respond "The company store." If the closed grammar or lexicon used by the speech recognition application does not include that response, the response will go unrecognized. Tuning systems to accommodate for failed recognition can be very time consuming and costly.

The discussion above is merely provided for general background information and is not intended to be used as an aid in determining the scope of the claimed subject matter.

SUMMARY

A clustering tool that generates word clusters for words found in unrecognized speech data or other input data is described. In embodiments disclosed, these clusters are used to modify closed grammars to achieve better recognition performance.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter

DETAILED DESCRIPTION

The present system deals with identifying word clusters. However, prior to discussing the system in greater detail, one embodiment of an environment in which the system can be deployed will be discussed.

Figure 1:
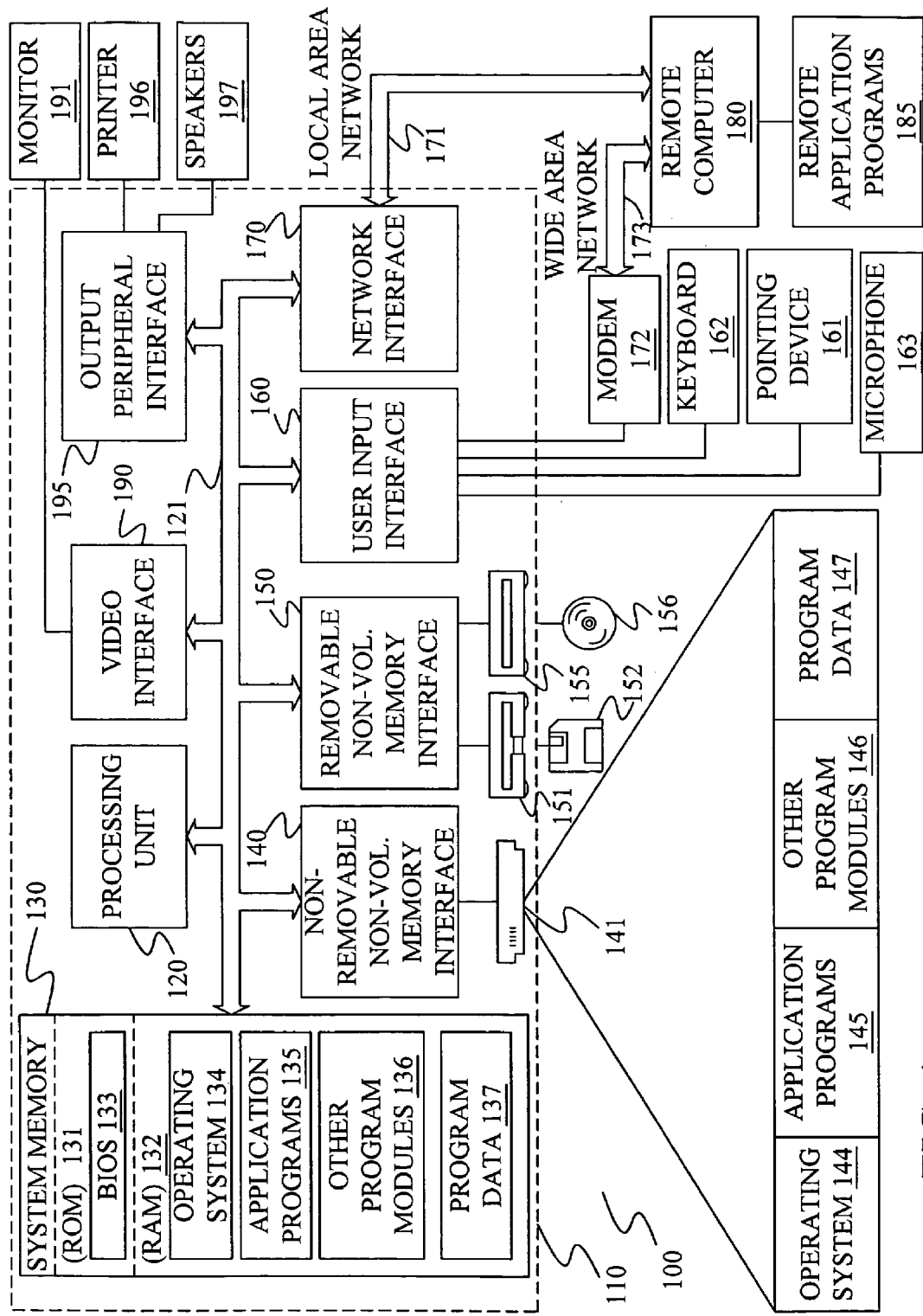
FIG. 1 is a block diagram of one illustrative embodiment of a computing environment in which embodiments of the present invention can be used or implemented.

FIG. 1 illustrates an example of a suitable computing system environment 100 on which embodiments may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

Embodiments are operational with numerous other general purposes or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing some embodiments includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
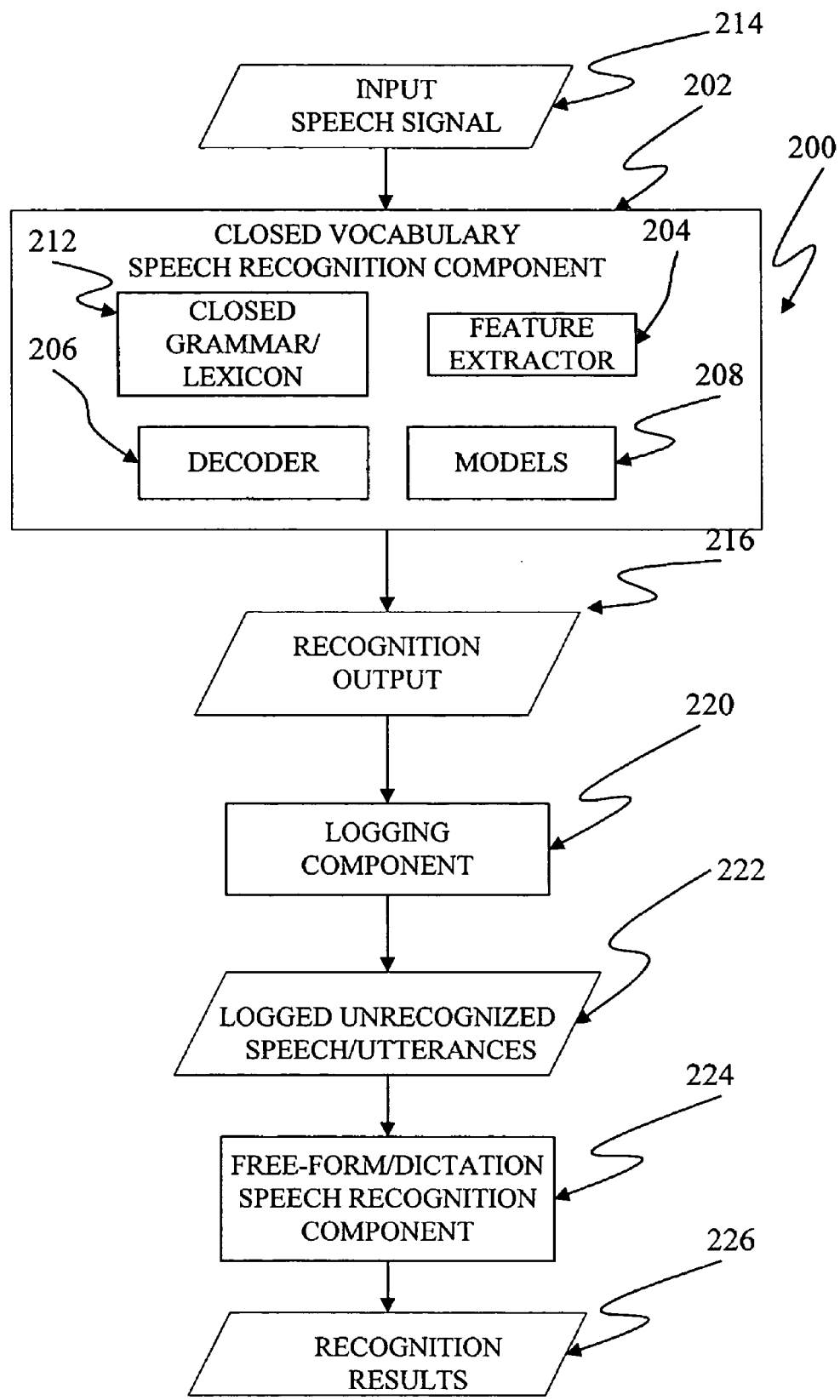
FIG. 2 is a block diagram illustrating an embodiment of a speech recognition application.

Word clustering as described in the present application has application for a speech recognition system or speech application. As shown in FIG. 2, one such speech recognition application 200 includes a closed vocabulary speech recognition component 202 which, as shown, includes a feature extractor 204, decoder 206, models 208 and a closed grammar or lexicon 212. By closed vocabulary speech recognition component 202, it is meant that component 202 will only recognize words or speech units found in the grammar or lexicon 212. This is in contrast to a dictation-type speech recognition system which outputs a best guess recognition, based on a speech input, regardless of whether that input is found in any grammar or lexicon. Models 208 are illustratively acoustic and language models, and feature extractor 204 and decoder 206 are illustratively known speech recognition components and their detailed operation can vary widely without departing from the scope of the present system. Basically, the speech recognition component 202 receives an input speech signal 214 and decodes it with decoder 206, using feature extractor 204, closed grammar 212 and models 208, in a known manner. Component 202 then outputs recognition results 216.

The application shown in FIG. 2 includes a logging component 220 to log speech which is not recognized by the closed vocabulary speech recognition component 202. The logged, unrecognized speech 222 is provided to a free-form/dictation speech recognition component 224. Recognition component 224 outputs a speech recognition result 226 based on the speech input, without being limited to words found in the grammar or lexicon 212. Therefore, component 224 outputs recognition results 226 for the unrecognized speech provided from the closed vocabulary speech recognition component 202.

Figure 3:
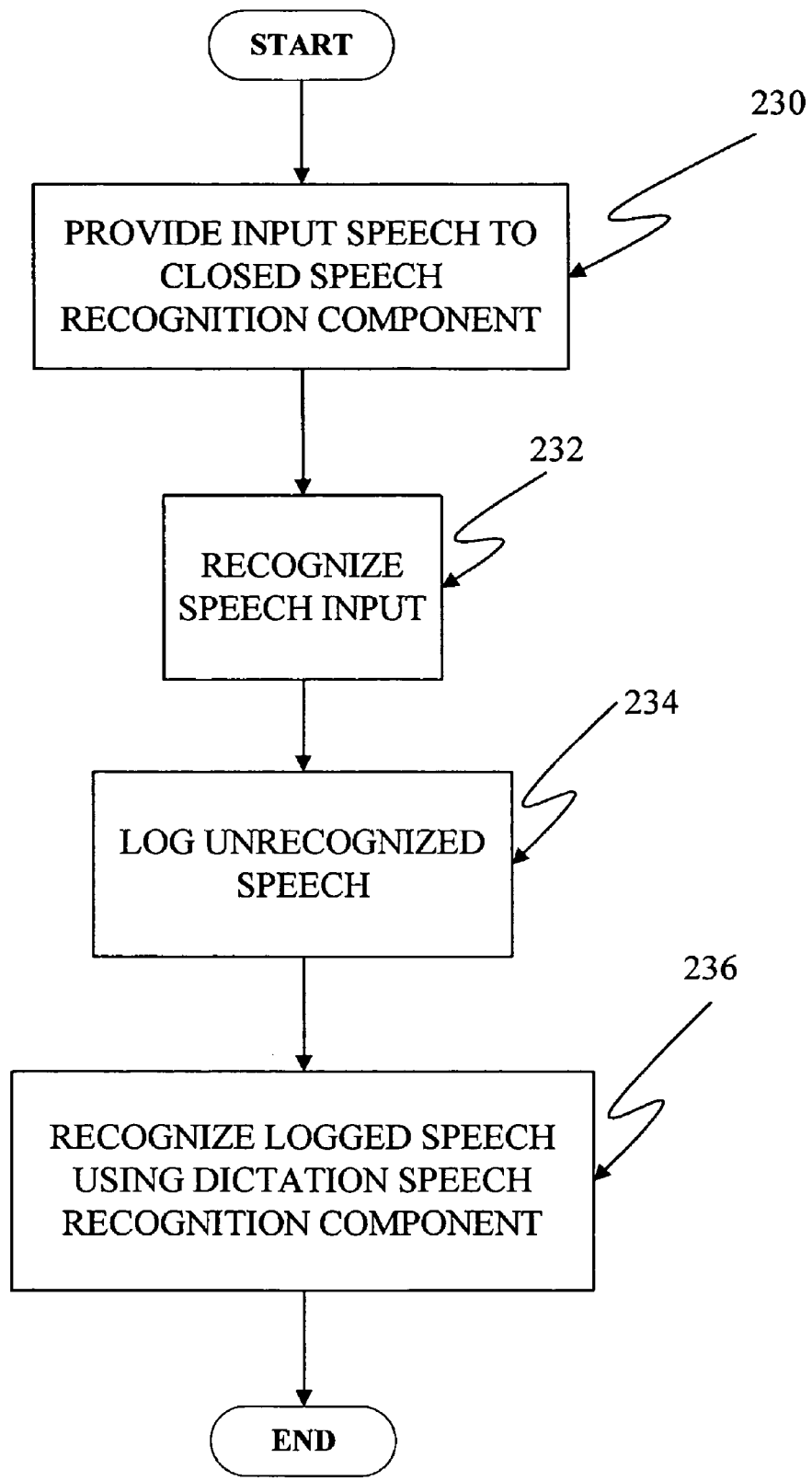
FIG. 3 is a flow chart including steps for generating data for a clustering tool of FIG. 4.

The steps for generating speech recognition results 226 are shown more specifically in the flow chart of FIG. 3. As shown, input speech signal 214 is provided to speech recognition component 202 in step 230. The input speech signal 214 is recognized using the closed grammar or vocabulary 212 in step 232 and unrecognized speech from the closed vocabulary speech recognition component 202 is logged in step 234. The logged unrecognized speech 222 is provided to, and recognized by, the free-form or dictation speech recognition component 224 as illustrated in step 236.

Figure 4:
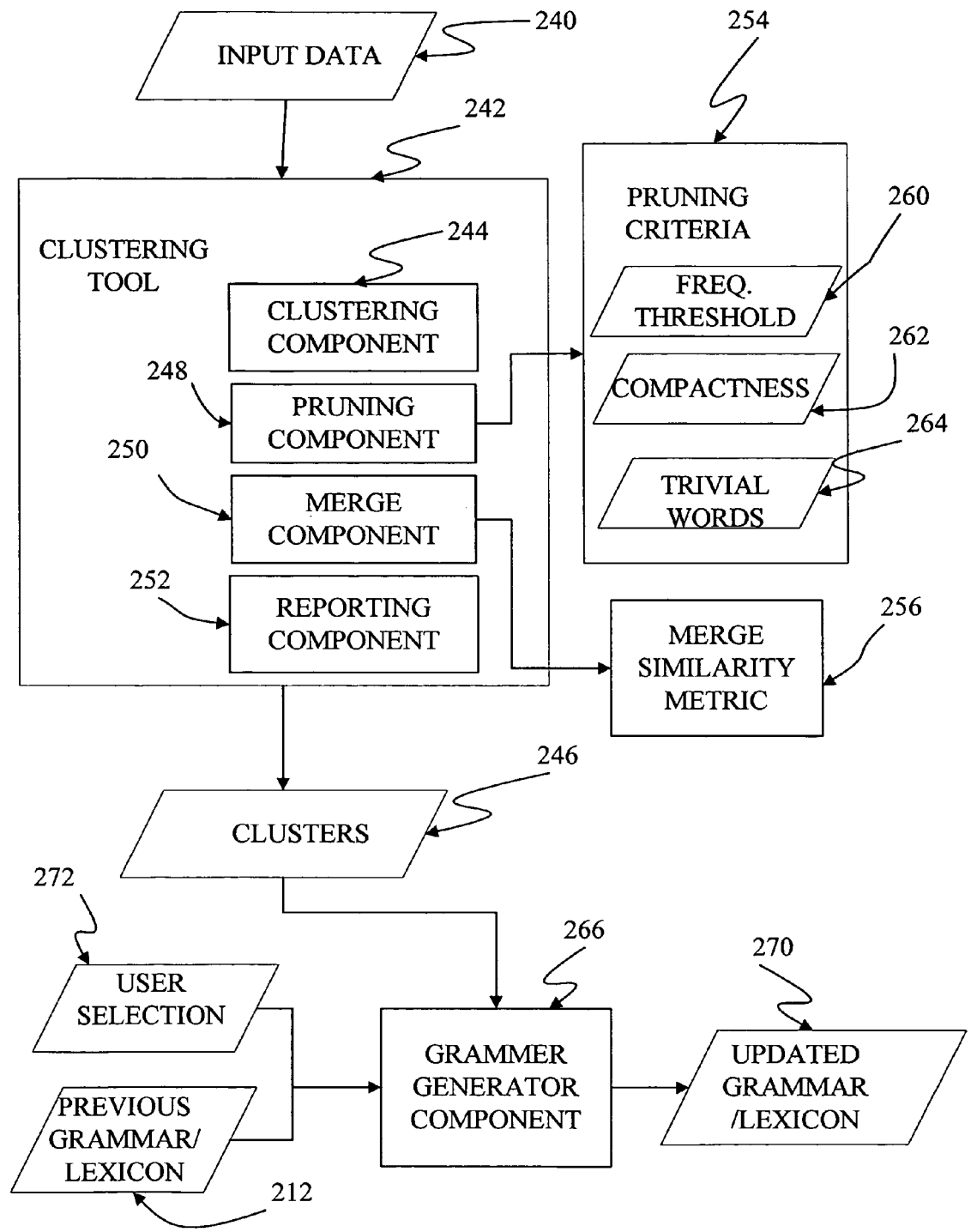
FIG. 4 is a block diagram illustrating an embodiment of a clustering tool for identifying word clusters in input data.

The recognition results 226 generated by steps 230-236 provide input data 240 (e.g. textual input) for a clustering tool 242, shown in FIG. 4. In the embodiment illustrated in FIG. 4, the clustering tool 242 includes a clustering component 244 which processes the free-form speech recognition results 226 to generate word clusters 246. The word clusters 246 are sets of words that co-occur in a number of utterances in the input data 240. The clustering tool 242, as shown, also illustratively includes a pruning component 248, a merge component 250 and a reporting component 252 to generate and output the word clusters 246.

The pruning component 248 and merge component 250 are used by clustering tool 242 to generate clusters. Pruning component 248 is configured to prune clusters output from the clustering component 244 based upon one or more pruning criteria 256. Merge component 250 merges clusters generated by clustering component 244 based upon a similarity metric 256. In the illustrated embodiment, the pruning criteria 254 can include a frequency threshold 260, a compactness setting 262, and trivial word list 264. The criteria 254 are used to eliminate statistically less relevant data. Pruned and merged data is provided to the reporting component 252 to report word clusters 246.

It will be noted that, although FIG. 4 illustrates three pruning criteria 260, 262, 264, application is not limited to the three pruning criteria nor does the application require the three pruning criteria disclosed. Pruning and merging are discussed in greater detail below.

In the illustrated embodiment, clusters 246 reported by the clustering tool 242 are provided to a grammar generator component 266. The grammar generator component 266 can be used to update the closed grammar or lexicon 212 of the closed vocabulary speech recognition component 202 to include desired clusters 246. As shown, the grammar generator component 266 receives previous grammar 212 and generates an updated grammar or lexicon 270 based upon the grammar or lexicon 212 and user selection input 272 that selects which clusters 246 are to be input into the grammar 212.

Figure 5:
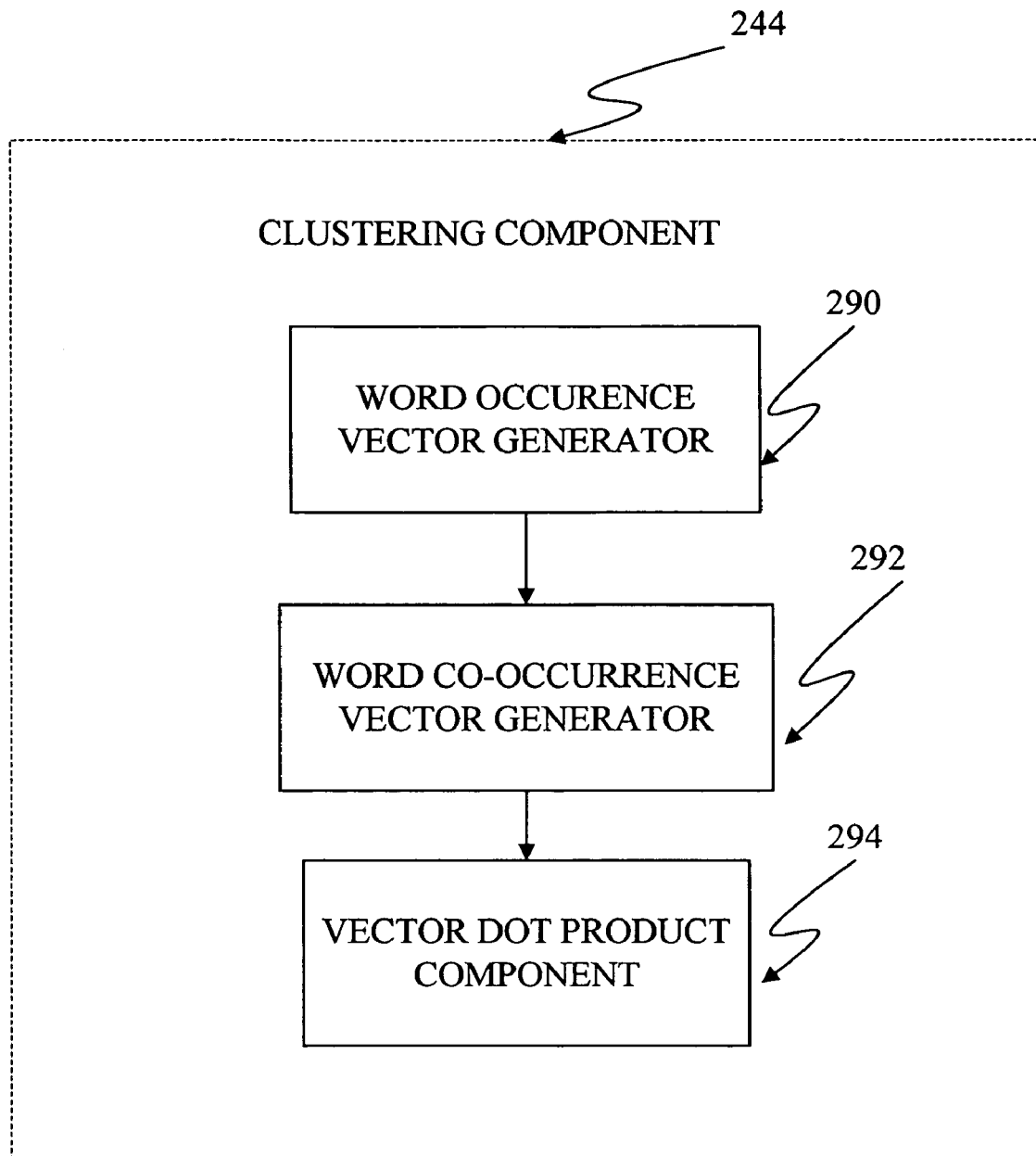
FIG. 5 is a block diagram illustrating an embodiment of a clustering component of the clustering tool of FIG. 4.

FIG. 5 is a block diagram of one embodiment of clustering component 244 in more detail. In the embodiment shown in FIG. 5, the clustering component 244 includes a word occurrence vector generator 290, a word co-occurrence vector generator 292 and a vector dot product component 294 to generate clusters as co-occurring word combinations from the input data 240.

Figure 6:
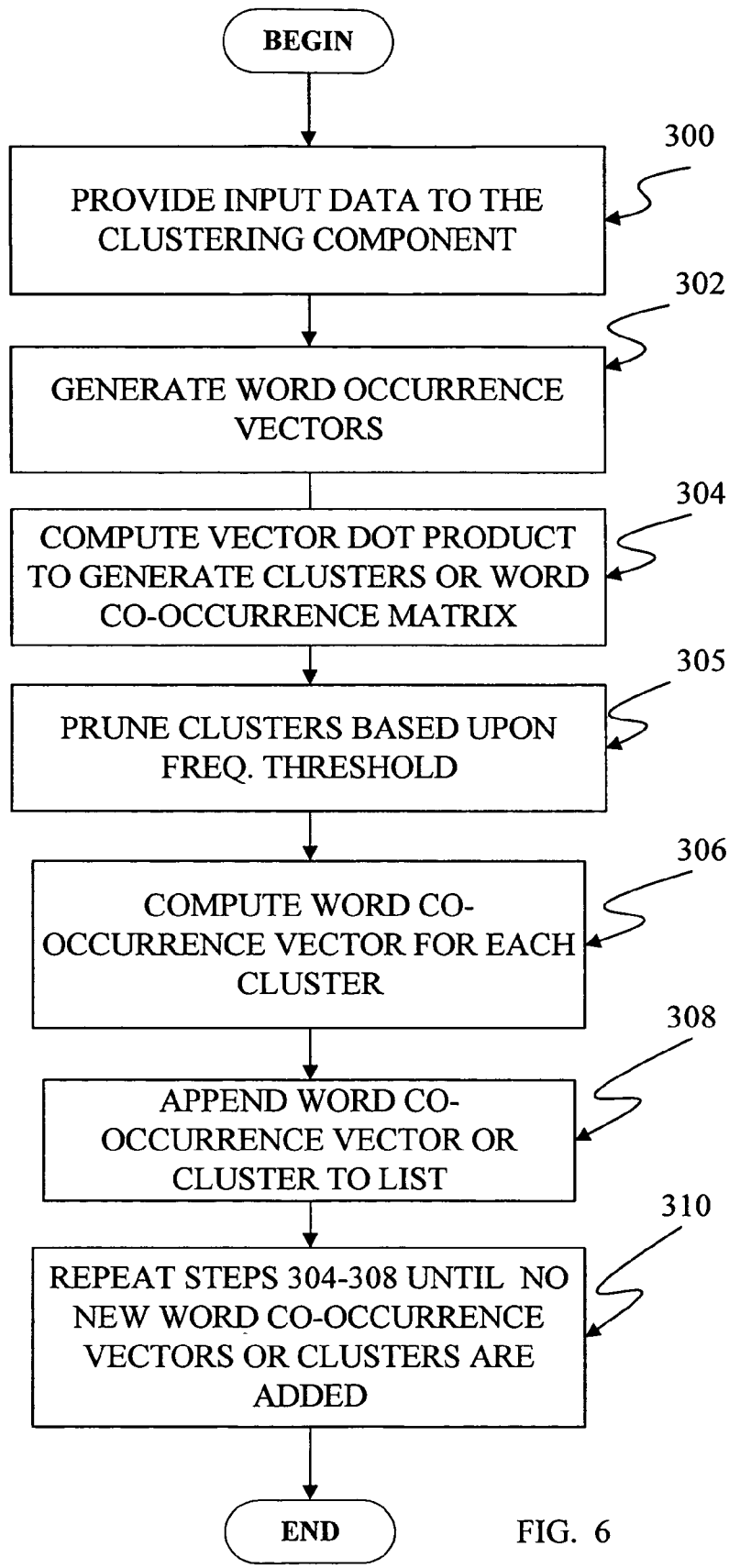
FIG. 6 is a flow chart illustrating steps for generating word clusters from input data.

FIG. 6 is a flow diagram illustrating one embodiment of the operation of the clustering component 244. As illustrated by step 300 in FIG. 6, input data 240 is provided to the clustering component 244. The input data 240 illustratively includes a plurality of utterances or speech entries including one or more words. Example input data 240 including multiple word utterances or speech entries are provided in Table I below.

TABLE I

| No. | Utterance |
|---|---|
| 1 | "company store" |
| 2 | "the company store" |

TABLE I-continued

| No. | Utterance |
|---|---|
| 3 | "company property" |
| 4 | "the company store" |
| 5 | "the company property" |

As shown in step 302 a word occurrence vector (WOC) is generated for each word found in the input speech data 240 by the word occurrence vector generator 290. The word occurrence vector (WOV) can be represented as $v=(v_1, v_2, \ldots, v_i, \ldots, v_n)$ where n is the number of utterances or entries in input data 240 and v is either a "1" or a "0" depending upon whether the word corresponding to this occurrence vector occurs in the corresponding utterance.

Thus, for the input data of Table I, the word occurrence vectors for each of the words "company", "store", "property" and "the" are provided in the Table II below.

TABLE II

| Word | Word occurrence vector |
|---|---|
| Company | V = (1, 1, 1, 1, 1) |
| Store | V = (1, 1, 0, 1, 0) |
| Property | V = (0, 0, 1, 0, 1) |
| The | V = (0, 1, 0, 1, 1) |

Thus for the word "company", the word occurrence vector $v=(1, 1, 1, 1, 1)$ since the word "company" appears in each of the entries or utterances (Nos 1-5) in Table I. The word occurrence vector for the word "store" is $v=(1,1,0,1,0)$ since the word "store" appears in the first, second and fourth utterances and not the third and fifth utterances, and so on.

In step 304, the vector dot product is computed between pairs of word occurrence vectors to generate clusters or word co-occurrence matrix M for all of the word pairs in the input data 240. Word co-occurrence matrix elements $M_{i,j}$ of the word occurrence matrix M represent the co-occurrence of the words i and j in the input data, where i and j each represent a word in word pairs in the input data.

For example, for the words i and j having word occurrence vectors $v_i$ and $v_j$, the dot product, $$v_i \cdot v_j = \sum_{k=0}^{k=n} v_{i_k} \cdot v_{j_k}$$

is the summation of all joint occurrences of words i and j in each of the n utterances or entries. Thus, the vector dot product provides the number of times the words i and j jointly occur in the input data. If they never jointly appear in any utterance, then their dot product is zero, signifying that these two words do not form a cluster or word combination.

The word co-occurrence matrix M is symmetric because vector dot product is commutative and thus processing is restricted to the upper or lower triangular part of the matrix. To simplify processing complexity, diagonal positions of the matrix M do not need to be computed because repeated word clusters, e.g. word cluster "the" and "the" in Table III below, usually stem from recognition errors. Only the off-diagonal upper triangular part of M, i.e. $M_{i,j}$ where j>i is computed to find all two word clusters, excluding clusters formed by repeating the same word multiple times. The value of matrix elements $M_{i,j}$ of the co-occurrence matrix is the frequency of the co-occurrence of words i and j or the frequency of the word cluster (i, j) in the input data.

Thus for the input data 240 of Table I, the co-occurrence matrix is provided in Table III below:

TABLE III

| Vector | Company | Store | The | Property |
|---|---|---|---|---|
| Company | 0 | 3 | 3 | 2 |
| Store | 0 | 0 | 2 | 0 |
| The | 0 | 0 | 1 | 1 |
| Property | 0 | 0 | 0 | 0 |

As shown in step 305 of FIG. 6, the word clusters (i,j) found in step 304 are pruned based upon the frequency threshold 260 (shown in FIG. 4) to reduce computational load and enhance computational speed. In particular, since the cluster data includes all word clusters, even those that occur only once in a set of utterances, the pruning component 248 illustratively uses a minimum threshold to require that a cluster appears a minimum number of times. For example in Table III above, clusters "the" and "property" are pruned since the cluster does meet the minimum frequency threshold 260. Setting a higher threshold directly results in decreased computational load and faster run time. The threshold 264 can be input by a user or preprogrammed, as desired.

A word co-occurrence vector (WCV) is generated for each two-word cluster having a threshold frequency as illustrated by block 306. The word co-occurrence vector (WCV) or cluster is then appended to a list, as indicated by block 308. The word co-occurrence vector (WCV), $v_{j\ldots k}$ is generated in step 306 for non-zero matrix elements $M_{i,j}$, that are also greater than the minimum cluster size threshold 260, by applying an AND (or equivalently, scalar multiplication) operator over word occurrence vectors $v_j$ through $v_k$ to generate the co-occurrence vector for the word pairs as illustrated in Pi Product Equation 1.

$$v_{j\ldots k} = \prod_{i=j}^{k} v_i \qquad \text{(Equation 1)}$$

The sum over all the elements of the WCV $v_{j\ldots k}$ gives the frequency of the word cluster consisting of all words numbered j through k.

The word co-occurrence vectors for the input data and matrix elements of Tables I and III are provided in Table IV below.

TABLE IV

| Cluster | Word co-occurrence vector |
|---|---|
| "company store" | V = (1, 1, 0, 1, 0) |
| "The company" | V = (0, 1, 0, 1, 1) |
| "company property" | V = (0, 0, 1, 0, 1) |
| "The store" | V = (0, 1, 0, 1, 0) |
| "The property" | V = (0, 0, 0, 0, 1) |

The process of steps 304-308 is repeated to generate additional word combinations (three word, four word, etc) until there are no additional word co-occurrence vectors or clusters added to the list as illustrated by block 310. More specifically, the vector dot product is computed for each word co-occurrence vector. The vector dot product $$v_{j\ldots k-1} \cdot v_k = \sum_{i=0}^{i=n} v_{j\ldots k-1_i} \cdot v_{k_i}$$

provides the summation of all of the joint occurrences for the word clusters (j ... k-1) and the word k, taken over the set of n utterances. This provides the larger word cluster (j ... k) and the result of the dot product is equal to the frequency of the larger cluster.

In other words, for each $WCV_{j\ldots k-1}$ of step 306, a check is made to see whether multiplying $WOV_k$ gives a non-zero dot product greater than the minimum cluster size threshold 260 to find additional clusters. It will be noted that it is sufficient to find any single zero amongst the WCM matrix elements $M_{j,k} \ldots M_{r-1,k}$ to infer that $WCV_{j\ldots k}$ would be a zero vector (i.e. not a cluster). In such cases, the vector AND need not be performed. Further only the upper hyper-triangles need to be expanded to enumerate all unique larger clusters.

It will also be noted that clustering tool 242 can implement a list data structure to store larger clusters instead of n×n co-occurrence matrices. This is because of the likelihood of larger clusters being sparse, and so the list data structure is more efficient.

The clustering component 244 as described provides the existence and frequency of clusters or word combinations including two, three and larger word combinations. In the clustering component 244 described, all operations can be performed using bit-wise ANDs and addition. This means that the algorithm is very fast and inherently able to be implemented in parallel operations and scalable. For example, 64 word vectors can be processed in parallel on a 64-bit wide implementation.

Either during cluster formation as previously described, or after the clusters are formed, the clusters are pruned based upon pruning criteria 254 (shown in FIG. 4). Additional pruning functions are described in greater detail with respect to the flow diagram shown in FIG. 7.

In step 324, the pruning component 248 illustratively uses the compactness setting or constraint 262 to eliminate or prune clusters where the co-occurring words are not in close proximity to one another. It is believed that, in general, words that are located closely proximate one another in the input utterance form more reliable clusters. Therefore, the pruning component 248 utilizes word position data to prune clusters where the co-occurring words are not within the compactness setting (i.e, they are not within a given number of words of one another, indicated by the compactness setting).

In step 326, the pruning component 248 illustratively uses a data store of trivial words or clusters (e.g. "a [X] [X] the [X] and") to reduce or eliminate cluster data that would clutter the output clusters. In contrast, the pruning component 248 does not eliminate clusters such as "I am", "yes, thanks" etc. which could be valid clusters.

Figure 7:
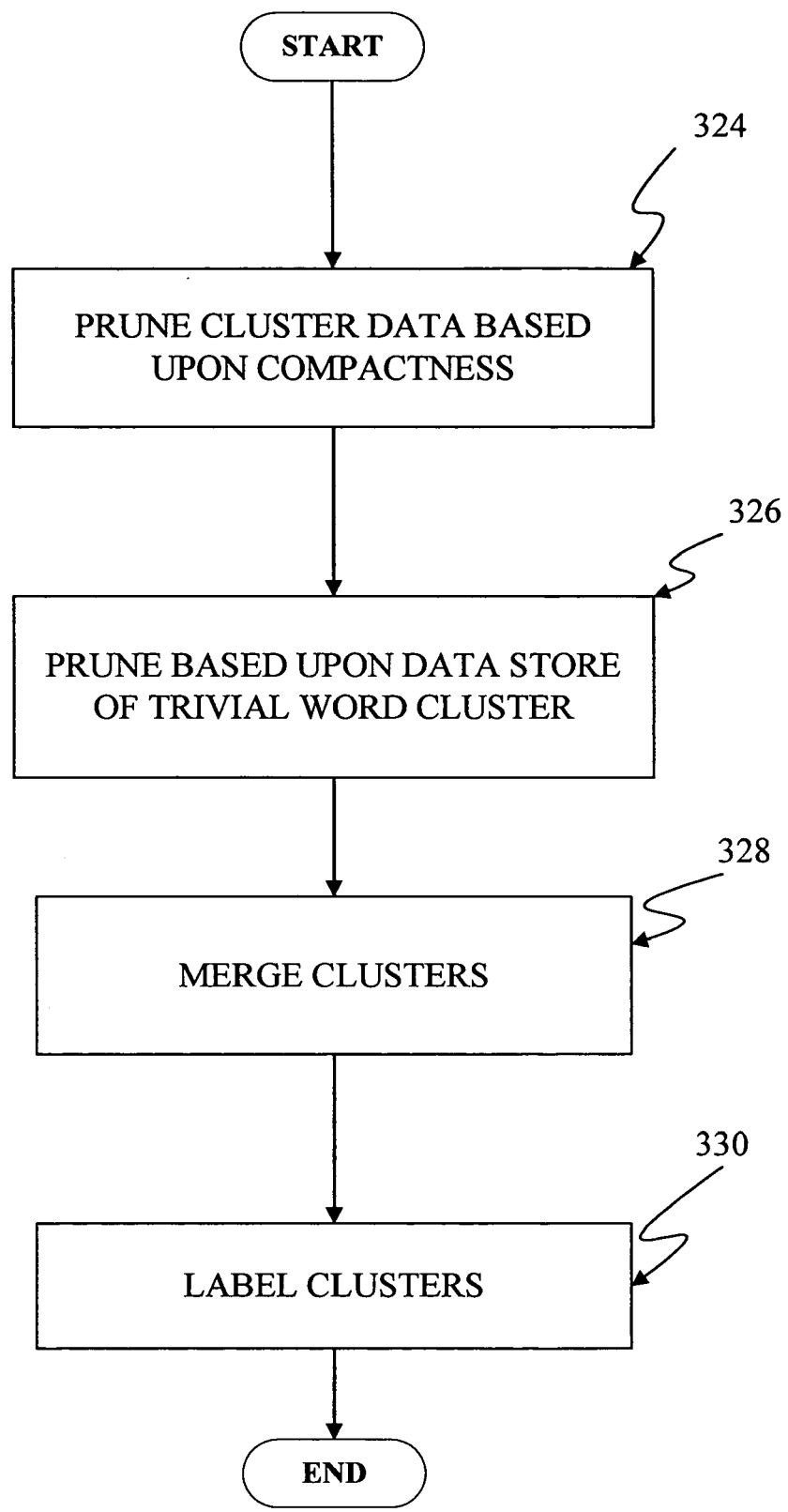
FIG. 7 is a flow chart illustrating post processing steps to report word clusters.

Similar clusters generated by the clustering component 244 and pruned by pruning component 248 are merged as illustrated in step 328 of FIG. 7. Clusters are merged based upon the likelihood the secondary cluster is merely a misrepresentation or mis-spelling of the primary cluster. This often happens in speech recognition where one spelling or phrase form is very close acoustically to another, e.g. "wheel" and "reel" In another example, "company still" may be a misrepresentation of "company store".

There are a variety of ways of identifying clusters for merger. In one embodiment for merging similar clusters is to review a list of alternate recognitions (or n-Best list) output by the speech recognition system (such as in the recognition lattice). In another embodiment, a similarity or distance metric is implemented to identify similarity or distance between the clusters based on acoustic similarity or confusability. Clusters are merged based upon a threshold similarity or distance value.

For example, let the set of main recognition results for n utterances be denoted as $R=\{r_1, r_2, \ldots, r_n\}$ and the clusters formed by the clustering component 244 be denoted as $C=\{c_1, c_2, \ldots, c_p\}$. The set of alternates of any given recognition result $r_i$, are denoted as Alt $(r_i)$. A new p×p square matrix is created and called the merge likelihood matrix, MLM, initially containing all zeros. The alternate recognition results are processed to generate merge matrix elements $MLM_{ij}$ of the merge likelihood matrix as provided by $\forall p,q$: $q \in Alt(p) \wedge p \in C_i \wedge q \in C_j$. The clusters (i, j), in which the corresponding matrix element of the merge matrix exceeds a set threshold, i.e. $\forall i,j: MLM_{ij} > Threshold \rightarrow Merge(i,j)$, are merged.

The merged cluster is labeled (i.e. the recognition string) using the label of the larger of the two merged clusters, e.g. the clusters having the largest frequency of occurrences, and its number of occurrences/frequency is the sum of the frequencies of the clusters being merged. Note that due to symmetry only off-diagonal upper (or lower) triangular elements of the merge likelihood matrix MLM are processed.

In another embodiment, clusters are merged based upon acoustic similarity using a similarity metric of how acoustically confusable the clusters are. All pairs of clusters are evaluated based upon the acoustic similarity metric and those which are very similar are merged. This is done iteratively until there are no further merges. Various systems for computing acoustic similarity or distance, and acoustic confusability are known and therefore will not be discussed in detail.

The reporting component 252 reports clusters generated by the clustering component 244. In one embodiment, the reporting component 252 reports the existence of (i.e. by noting non-zero matrix elements), and frequency of, all two or multiple word clusters. Each cluster is labeled as illustrated by step 330 in FIG. 7 by the reporting component 252 based upon the words in the cluster.

In one embodiment, the reporting component 252 utilizes word position information to label clusters. For example, in the case of input data from a call log including 10 utterances for "elevator not working", the clustering component finds the 10 instances for the combination of "working", "not" and "elevator" irrespective of word order. The reporting component 252 utilizes word position information to output or label the cluster 10:"elevator not working" to provide word order for the cluster.

Word order can differ among word clusters in the cluster data. For example, if the input data contains 9 occurrences of "elevator not working" and 1 occurrence of "not working elevator", the clustering component 244 finds a cluster for the word combination "not", "elevator" and "working" for both utterances "elevator not working" and "not working elevator".

The reporting component 252 can be configured to use the most frequent or most stable word order to report or label the cluster. Thus, in the illustrated embodiment, the reporting component 252 reports a single cluster labeled—10:"elevator not working" instead of reporting two fragmented clusters such as 9:"elevator not working" and 1:"not working elevator".

Word clusters can include intermediate words that occur in between cluster words. For example, for the cluster containing the words "building" and "reception" from a set of utterances:

1) "building one reception"

2) "building two reception"

3) "building four reception"

the reporting component 252 uses word position information to determine that there is a "wildcard word" between "building" and "reception". Thus, the cluster is reported as "cluster 3:Building [X] reception".

Word order and wildcards can differ for utterances in a cluster. In one embodiment, the reporting component 252 utilizes a statistical process to label more statistically relevant word order or wildcard placement and number for the cluster. For example, for a two word cluster for the words "travel", and "Florida" that occurs 20 times in the data set, if the word "travel" occurs two words before the word "Florida" 18 out of 20 times or 18: ("travel" [x] [x] "Florida") and the word "Florida" occurs one word before word "travel" once or 1: ("Florida" [x] "travel") and three words before the word "travel" once or 1: ("Florida" [x] [x] [x]"travel"), then the "average" position is reported in the following cluster label: 20: ("travel" [X] [X] "Florida").

The component can utilize a bubble sort or any other suitable sort to process the next relative position. This ensures that the labeling proceeds in the most frequent relative order.

For example for the words "travel" and "Florida" of the above clusters, the relevant word order is determined as follows:

Determine average/expected relative position of word "Florida" (summation of frequency×position) as follows: 18×4+2×1=72+2=74

Determine an average/expected relative position of word "travel" (summation of frequency×position) as follows: 18×1+1×2+1×5=25

Since the average relative position of "travel" is lower than "Florida" the relative ordering (as determined by bubble sort) is "travel", "Florida"

Next an average/expected number of wildcards between the words "travel" and "Florida" is determined based upon the (summation of the number of wildcards×frequency)/(number of clusters) as follow: 2×18−1×1−3×1)/20=1.6 which gets rounded to 2

So the final cluster label for the cluster is ("travel" [X] [X] "Florida")

The application describes a way of discovering all existing word clusters of size two or more occurring in a set of n sentences or utterances. Embodiments of this method have application for determining out-of-grammar utterance clusters for a speech recognition system, but application is not limited to this specific application.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A linguistic tool assembly including computer executable instructions on a computer storage media and the computer executable instructions being executed by a processing unit to implement one or more components of the linguistic tool comprising:
   a clustering component which receives input data indicative of a plurality of input utterances and generates word clusters indicative of at least two or more words co-occurring in the utterances in the input data wherein the clustering component includes a word occurrence or co-occurrence vector generator which processes the input data to generate at least one word occurrence or co-occurrence vector $v=(v_1, v_2)$ for one or more words in the input data where $v_1$ corresponds to a first input utterance in the input data and $v_2$ corresponds to a second input utterance in the input data and the $v_i$ is either "1" or "0" depending if the one or more words occur in the first input utterance or if the one or more words do not occur in the first input utterance and the $v_2$ is either "1" or "0" depending if the one or more words occur in the second input utterance or if the one or more words do not occur in the second input utterance and the clustering component including a vector dot product component which receives at least two word occurrence or co-occurrence vectors and calculates a vector dot product between the at least two word occurrence or co-occurrence vectors to generate a symmetrical word co-occurrence matrix having an upper triangular part, a lower triangular part, and a plurality of diagonal positions, and to provide a frequency of the co-occurrence of the words of the at least two word occurrence or co-occurrence vectors and the clustering component processing the output of the vector dot product component to output the word clusters for the co-occurrence of the at least two or more words above a threshold frequency in the plurality of input utterances, wherein processing of the word co-occurrence matrix is restricted to the upper or lower triangular part of the matrix and the plurality of diagonal positions are not computed to exclude repeated word clusters stemming from recognition errors; and
   a grammar generator component configured to receive the output word clusters from the clustering component and generate grammar elements for the output word clusters above the threshold frequency and configured to add the grammar elements for the word clusters to a closed set of grammar elements stored on the computer storage media and used a speech recognition component for transcribing speech.

2. The linguistic tool assembly of claim 1 and further comprising a merge component to merge a first word cluster and a second word cluster to form a merged word cluster including both the first and second word clusters based upon at least one of an acoustic similarity of one or more words of the first and second word clusters or n-Best recognition results for the one or more words of the first and second word clusters.

3. The linguistic tool assembly of claim 1 and further comprising a pruning component configured to prune the word clusters to reduce the word clusters based upon at least one of a compactness setting or a data store of trivial words.

4. The linguistic tool assembly of claim 1 and further including a reporting component which labels the word clusters utilizing word position information.

5. The linguistic tool assembly of claim 1 wherein the word occurrence or co-occurrence vector generator receives at least two word occurrence or co-occurrence vectors and generates a word co-occurrence vector for the at least two word occurrence or co-occurrence vectors using a bit-wise AND function.

6. A computer-implemented method comprising the steps of:
   recognizing, by a computer, words in speech input utterances;
   generating, by the computer, word occurrence or co-occurrence vectors for the words in the speech input utterances;
   computing, by the computer, a vector dot product between at least one first word occurrence vector or co-occurrence vector and at least one second word occurrence or co-occurrence vector to generate a symmetrical word co-occurrence matrix having an upper triangular part, a lower triangular part, and a plurality of diagonal positions, and to identify word clusters being indicative of the words that co-occur in clusters in the speech input utterances and provide a co-occurrence frequency of the word clusters, wherein processing of the word co-occurrence matrix is restricted to the upper or lower triangular part of the matrix and the plurality of diagonal positions are not computed to exclude repeated word clusters stemming from recognition errors;
   identifying the computer, one or more word clusters in the input utterances having at least a threshold word co-occurrence frequency using the co-occurrence frequency provided by the computation of the vector dot product; receiving user input selections to input one or more word clusters having the threshold word co-occurrence frequency into a grammar or lexicon for a speech recognition component; and
   generating, by the computer, one or more grammar inputs corresponding to the one or more word clusters selected for input to the grammar or lexicon.

7. The method of claim 6 and further comprising the steps of:
   generating a word co-occurrence vector for the one or more word clusters having the at least threshold word co-occurrence frequency; and
   computing a vector dot product between the word co-occurrence vector and another word occurrence vector or co-occurrence vector to identify additional word clusters having at least the threshold word co-occurrence frequency.

8. The method of claim 7 and comprising the step of:
   computing a pi-product to generate the word co-occurrence vectors for the word clusters.

9. The method of claim 6 and further comprising the steps of:
   logging unrecognized speech data from a closed vocabulary speech recognition component; and
   recognizing the logged unrecognized speech data using a free-form speech recognition system to recognize the words in the speech input utterances.

10. The language tool assembly of claim 1 and comprising a merge component to process the word clusters and generate a merge likelihood matrix based upon alternate recognition results.

11. The method of claim 7 and comprising:
   repeating the steps of computing the vector dot product for the word co-occurrence vector and the other word occurrence or co-occurrence vector to identify word co-occurrence between the word co-occurrence vector and the other word occurrence or co-occurrence vector; and
   generating an additional word co-occurrence vector for the threshold word co-occurrence frequency between the word co-occurrence vector and the other word occurrence or co-occurrence vector.

12. The method of claim 7 wherein the step of generating the word co-occurrence vector uses a bit-wise AND function.

13. A computer-implemented method comprising the steps of:
- recognizing, by a computer, words in a plurality of speech input utterances using a speech recognition component stored on the computer storage media to recognize the words in the plurality of speech input utterances;
- generating, by the computer, word occurrence or co-occurrence vectors for the words in the plurality of speech input utterances;
- computing, by the computer, a vector dot product between at least one first word occurrence vector or co-occurrence vector and at least one second word occurrence or co-occurrence vector to generate a symmetrical word co-occurrence matrix having an upper triangular part, a lower triangular part, and a plurality of diagonal positions;
- processing, by the computer, the results of the vector dot product computation for the words of the at least one first word occurrence vector or co-occurrence vector and the at least one second word occurrence or co-occurrence vector having at least a threshold co-occurrence frequency to identify word clusters including two or more words co-occurring in the input utterances, wherein processing of the word co-occurrence matrix is restricted to the upper or lower triangular part of the matrix and the plurality of diagonal positions are not computed to exclude repeated word clusters stemming from recognition errors;
- pruning, by the computer, the word clusters using a compactness threshold based upon separation between the two or more co-occurring words in the input utterances to eliminate one or more of the word clusters where the co-occurring words are not in sufficient proximity in the input utterances;
- identifying, by the computer, two or more related word clusters based upon a similarity metric;
- merging, by the computer, the two or more related word clusters in the plurality of speech input utterances to form a merged word cluster for the two or more related word clusters; and
- reporting, by the computer, the word clusters in the plurality of speech input utterances.

14. The method of claim 13 and comprising:
- using the reported word clusters in the plurality of speech input utterances to generate or update a grammar or lexicon for the speech recognition component.

15. The method of claim 13 and comprising the steps of:
- recognizing the speech input utterances using a closed vocabulary speech recognition component;
- logging unrecognized speech input utterances and recognizing the logged speech input utterances using a free-form speech recognition system; and
- generating the word occurrence or co-occurrence vectors for the words in the input utterances of the logged unrecognized speech input utterances.

16. The method of claim 13 wherein the step of identifying the two or more related word clusters comprises:
- processing alternate recognition results from the speech recognition component; and
- generating a merge likelihood matrix using the alternate recognition results.

17. The method of claim 13 wherein the step of identifying the two or more related word clusters comprises:
- determining an acoustic similarity between one or more words of the word clusters; and
- merging the acoustically similar word clusters to form the merged word cluster.

18. The method of claim 13 and comprising the step of
- processing the plurality of input utterances for the word clusters; and
- using order and separation of words of the word clusters in the plurality of speech input utterances to report the word clusters using wildcards to illustrate the separation of the words in the word clusters.

19. The linguistic tool assembly of claim 1 and comprising:
- a pruning component configured to prune the word clusters using a compactness threshold based upon separation between the two or more words of the word clusters to eliminate one or more of the word clusters where the co-occurring words are not in sufficient proximity.

20. The method of claim 14 and comprising the step of:
- receiving user input selections of the reported word clusters to include in the grammar or lexicon; and
- generating an input to the grammar or lexicon for the user input selections of the reported word clusters.

\* \* \* \* \*